(12) United States Patent
Brown et al.

(10) Patent No.: US 7,789,060 B2
(45) Date of Patent: Sep. 7, 2010

(54) CYLINDER HEAD GASKET FOR AN INTERNAL COMBUSTION ENGINE

(75) Inventors: Courtney T. Brown, Flintville, TN (US); Matthew J. Clarke, Grayslake, IL (US); Wence Prikazsky, Western Springs, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 713 days.

(21) Appl. No.: 11/753,205

(22) Filed: May 24, 2007

(65) Prior Publication Data
US 2008/0290607 A1 Nov. 27, 2008

(51) Int. Cl.
*F02F 11/00* (2006.01)
(52) U.S. Cl. .................. 123/193.3; 277/591
(58) Field of Classification Search .......... 277/313, 277/591–598; 123/193.3
See application file for complete search history.

(56) References Cited

U.S. PATENT DOCUMENTS

| | | | | |
|---|---|---|---|---|
| 3,586,338 A | * | 6/1971 | Miklau et al. | 277/313 |
| 6,883,483 B1 | * | 4/2005 | Knudsen et al. | 123/90.37 |
| 2004/0231630 A1 | * | 11/2004 | Liebert | 123/193.3 |
| 2007/0102887 A1 | * | 5/2007 | Sandford | 277/598 |

* cited by examiner

*Primary Examiner*—M. McMahon
(74) *Attorney, Agent, or Firm*—Jack D. Nimz; Jeffrey P. Calfa

(57) ABSTRACT

A gasket (122) includes a first plurality of cylinder openings (402) arranged to correspond, one each, to a corresponding first plurality of cylinder bores (106) formed in a crankcase (102) of an internal combustion engine (100). A second plurality of coolant openings (404) and a third plurality of oil openings (406) are formed in a substrate sheet of material that makes up the gasket (122). A fourth plurality of pushrod openings (408) is formed in the substrate material of the gasket (122). Each of the fourth plurality of pushrod openings (408) includes a pass through portion (302) that has a semicircular shape with an internal diameter, D, and an alignment portion (304) that has a semicircular shape with an internal diameter, d. The diameter d is smaller than the diameter D. The pass-through portion (304) is located adjacent to the alignment portion (302).

3 Claims, 2 Drawing Sheets

CYLINDER HEAD GASKET FOR AN INTERNAL COMBUSTION ENGINE

FIELD OF THE INVENTION

This invention relates to internal combustion engines, including but not limited to a cylinder head gasket having openings, which openings allow passage of pushrods therethrough, and also align the pushrods with respect to other engine components.

BACKGROUND OF THE INVENTION

Internal combustion engines include crankcases having a plurality of cylinders. The cylinders contain pistons whose reciprocating motion due to combustion events may be transferred through a crankshaft to yield a torque output of the engine. Often, engine crankcases are made of cast metal, and include passages integrally formed therein for the transfer of various fluids from one location of the engine to another.

Each of the plurality of cylinders is in fluid communication with at least one inlet valve and one outlet valve. Operation of each of the inlet and outlet valve is configured to correspond to a specific position during engine operation. Opening and closing events of each of the inlet and outlet valve are controlled by a camshaft, or, a shaft that synchronously rotates with engine and has lobes formed thereon that push open various engine components mechanically connected to each of the inlet and outlet valves.

In one engine configuration, a plurality of roller tappets rest on the camshaft of an engine and follow a contour of a plurality of lobes. As the camshaft rotates, each of the roller tappets reciprocally moves up and down. Each roller tappet is connected to a pushrod, which in turn is connected to other components that translate the reciprocal motion of each roller tappet, through the pushrod, into a reciprocal opening and closing motion of a valve fluidly connected to a cylinder.

Due to the function and operation of the pushrods, it is desirable to ensure proper position and alignment of each of the pushrods in an engine. Some engines, and especially engines having two banks of cylinders arranged in a "V" configuration, have pushrods oriented at angles with respect to a horizontal plane. While the engine is being assembled, these angles may cause the pushrods to fall out of position until fully assembled. This and other issues may be avoided as described below.

SUMMARY OF THE INVENTION

A gasket includes a first plurality of cylinder openings arranged to correspond, one each, to a corresponding first plurality of cylinder bores formed in a crankcase of an internal combustion engine. A second plurality of coolant openings and a third plurality of oil openings are formed in a substrate sheet of material that makes up the gasket. A fourth plurality of pushrod openings is formed in the substrate material of the gasket. Each of the fourth plurality of pushrod openings includes a pass through portion that has a semicircular shape with an internal diameter, D, and an alignment portion that has a semicircular shape with an internal diameter, d. The diameter d is smaller than the diameter D. The pass-through portion is located adjacent to the alignment portion such that they two openings together form a keyhole shape.

DESCRIPTION OF A PREFERRED EMBODIMENT

The following describes an apparatus for incorporating alignment features into a cylinder head gasket of an internal combustion engine, and a method of installing a cylinder head onto the engine. The alignment features advantageously align one or more pushrods during assembly of the engine and avoid issues with pushrod misalignment. These alignment features comprise one or more openings having a "keyhole" shape that allows insertion and alignment of a pushrod into each opening.

Figure 1:
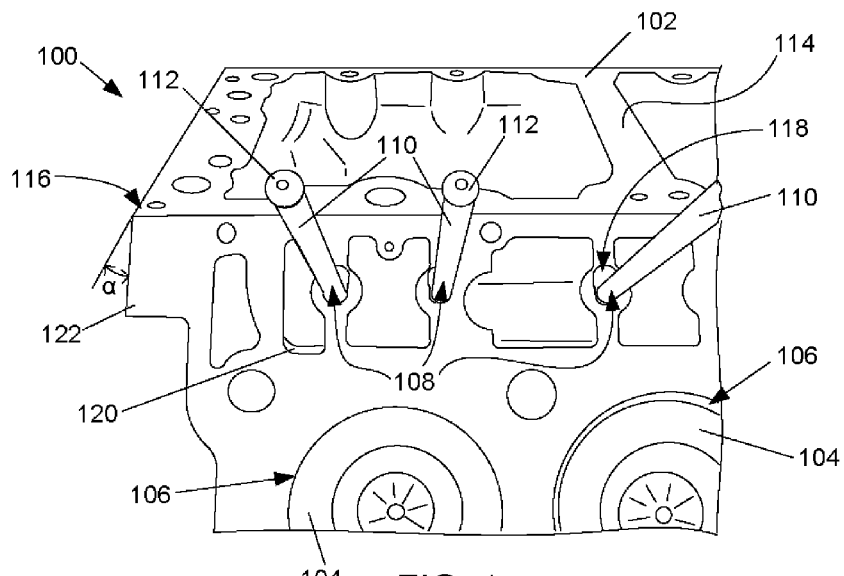
FIG. 1 is an outline view of a partially assembled engine having pushrods inserted through openings in a gasket in accordance with the invention.

An outline view of a partially assembled engine 100 is shown in FIG. 1. The engine 100 at the state of assembly shown includes a crankcase 102 having a plurality of pistons 104 inserted, one each, into a plurality of bores 106 that are formed into the crankcase 102. Each of the pistons 104, as is known, is connected via a connecting rod (not shown) to a crankshaft (not shown) that is assembled into the crankcase 102. The crankshaft is operably associated with a camshaft (not shown) that has a plurality of roller tappets (not shown) resting thereon. Each roller tapped is connected to a pushrod 108.

Each pushrod 108 comprises an elongate shaft 110 having a spherical joint 112 connected to either end thereof. The spherical joint 112 fits into a socket portion of a mating part, typically the roller tappet (not shown) on one end and a rocker arm (not shown) on another end, and is arranged and constructed to allow for angular motion there-between during operation of the engine 100. In the orientation of the crankcase 102 shown, a valley surface 114 of the crankcase 102 is on a horizontal plane 116, which means that each of the pushrods 108 that perpendicularly protrude therefrom are at an angle, $\alpha$, with respect to the horizontal plane 116. In the embodiment shown $\alpha$ is about 45 degrees.

During assembly of the engine 100, the pushrods 108 are inserted through openings 118 that run clear through and between a "flame-deck" surface 120 of the crankcase 102 and the roller tappets. A cylinder head gasket 122 is positioned onto the flame deck surface 120 before installation of a cylinder head (not shown) thereon. In a typical engine arrangement, the pushrods require secondary alignment features to maintain their alignment while a cylinder head is connected onto each flame deck of the crankcase. These secondary alignment features are typically external fixtures that hold the pushrods centered within the openings 118 of the crankcase 102 while the cylinder head is being positioned, or alternatively, involve careful positioning of the cylinder head in two steps; one step to insert the pushrods in respective openings in the cylinder head, and a second step to align the cylinder head with the crankcase and connect the two components while maintaining positioning of the pushrods. The assembly of the cylinder head onto the crankcase can be greatly simplified, accelerated, and improved as described below.

Figure 2:
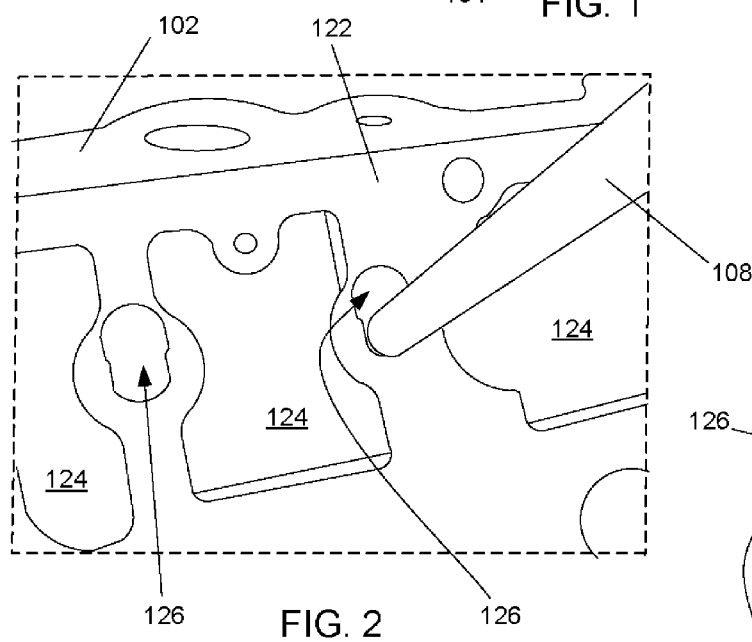
FIG. 2 is a detail view of the partially assembled engine of FIG. 1.

A detailed outline view of the cylinder-head gasket, or, head gasket 122, as installed onto the flame deck 120 of the crankcase 102, is shown in FIG. 2. The head gasket 122 has a plurality of openings 124 formed therein that allow passage of fluids, such as coolant or oil, from the crankcase 102 into the cylinder head, and vice versa. The openings 124 may be surrounded by a sealing bead (not shown) to prevent leakage of fluids. At least a second set of openings 126 is formed in the head gasket 122. The openings 126 allow passage of the pushrods 108 through the head gasket 122. The openings 126 are advantageously shaped such that each pushrod 108 is inserted through each opening 126, and also retained in a proper position for assembly of cylinder head with no secondary features.

Figure 3:
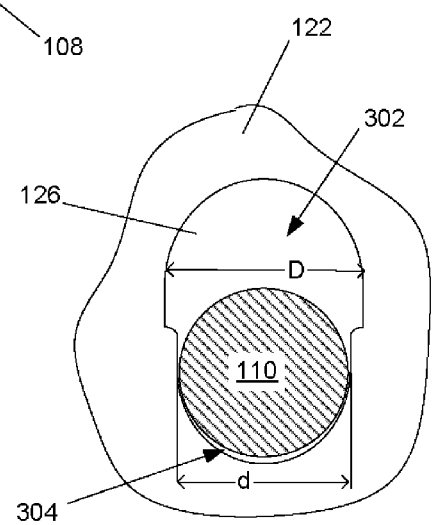
FIG. 3 is an outline view of a keyhole-shaped opening in a gasket in accordance with the invention.

In this embodiment, each of the openings 126 has a "keyhole" shape. The keyhole shape is shown in the detailed view of FIG. 3. Each opening 126 has a pass-through portion 302 and a "retention", or, alignment portion 304. The pass-through portion 302 has an elongated but substantially semicircular shape having an internal diameter, D. The internal diameter D is large enough to allow the spherical joint 112 of one of the pushrods 108 to pass through. The alignment portion 304 also has an elongated but substantially semicircular shape with an internal diameter, d. The diameter d of the alignment portion 304 is small enough to have a clearance fit with the elongate shaft 110 of a pushrod 108. During assembly of the engine 100, each one of the pushrods 108 may be inserted through each one of the openings 126 by first inserting the spherical joint 112 of each pushrod 108 through the pass-through portion 302 of the opening 126. Each pushrod 108 is then left to come to rest against each roller tappet, and then aligned within the alignment portion 304 of the opening 126. This alignment is accomplished by engaging a segment of the elongate shaft 110 of the pushrod 108 within the alignment portion 304.

Figure 4:
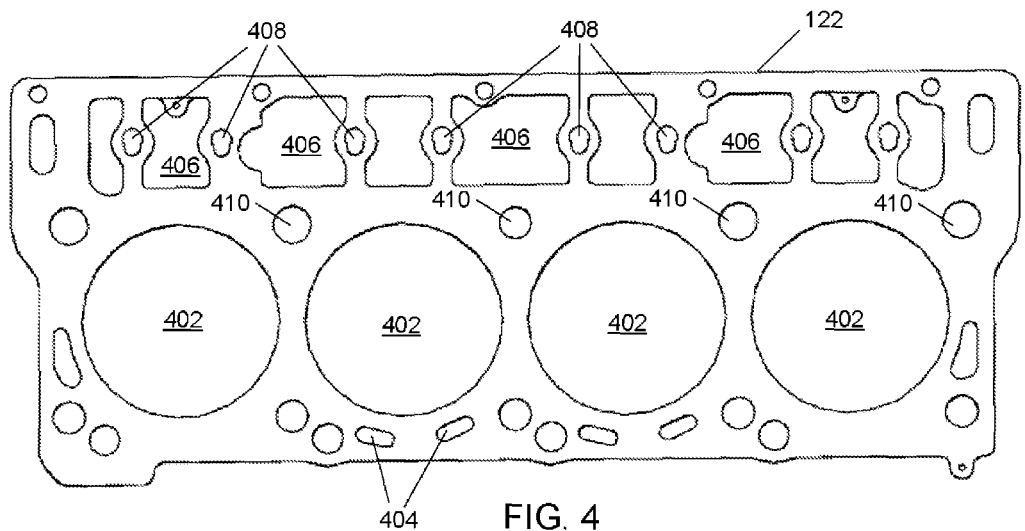
FIG. 4 is an outline view of a cylinder head gasket having keyhole-shaped openings for pushrods in accordance with the invention.

An outline view of the head gasket 122 is shown in FIG. 4. The head gasket 122 shown is a head gasket for an engine having a bank of four (4) cylinders, for example, a "V" engine having a total of eight (8) cylinders. The gasket 122 has a set of four (4) cylinder openings 402, a plurality of coolant openings 404 that surround the cylinder openings 402, a plurality of oil openings 406, and a plurality of pushrod openings 408 disposed between the oil openings 406. The gasket 122 also has a plurality of fastener openings 410 that are used for passage of fasteners (not shown) used to fasten a cylinder head to the crankcase of an engine.

In this embodiment, the gasket 122 has a total of eight (8) pushrod openings 408 formed on a single substrate sheet of multiple layer material that makes up the gasket 122. As is known, there are at least two pushrods that correspond to a cylinder of an engine, one pushrod used to actuate one or more intake valves, and one pushrod used to actuate one or more exhaust valves, per cylinder. Use of the gasket 122 advantageously enables alignment of all eight (8) pushrods corresponding to each bank of the V-8 engine to be alignment simultaneously while the engine is assembled and before the cylinder head is placed onto the crankcase.

Figure 5:
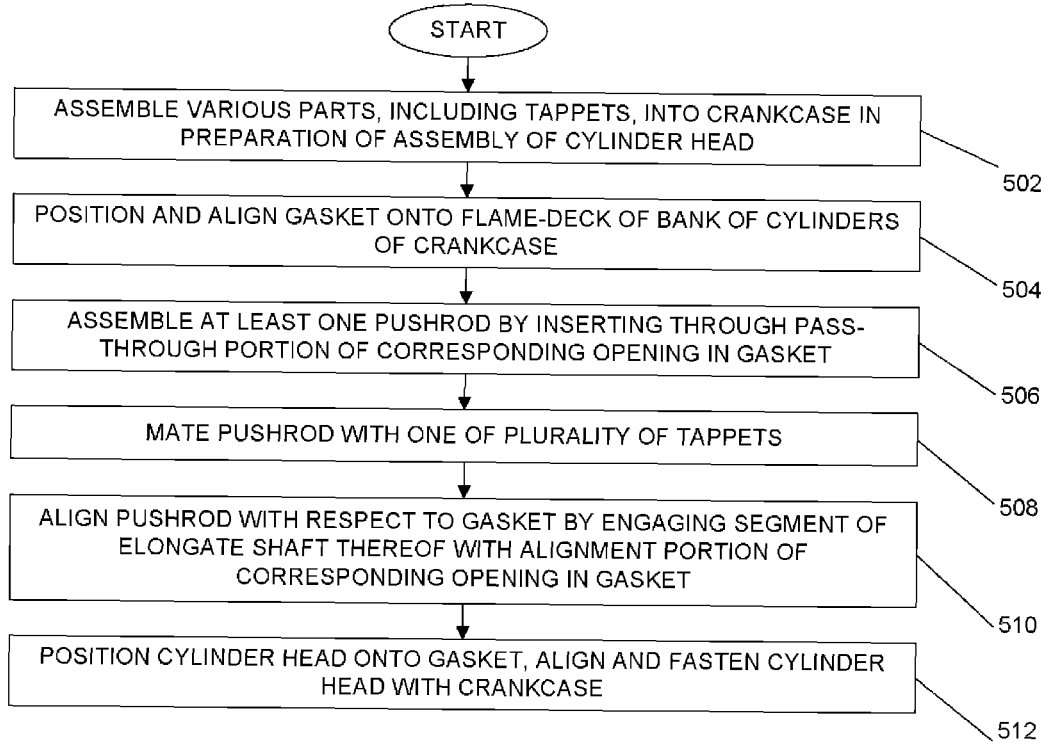
FIG. 5 is a flowchart for a method of assembling a cylinder head onto a crankcase of an internal combustion engine using a gasket in accordance with the invention.

A flowchart for a method of placing a cylinder head onto a crankcase of an engine is shown in FIG. 5. Various components, such as a crankshaft, pistons, connecting rods, camshaft, roller tappets, and so forth, are assembled into a crankcase of an engine in preparation of assembly of a cylinder head at step 502. A gasket is positioned and aligned onto a flame deck of a bank of cylinders of the engine at step 504. A plurality of pushrods is assembled onto the engine, with each one pushrod being inserted through a pass-through portion of a corresponding opening in the gasket at step 506. Each pushrod is mated with a corresponding tappet at step 508. Each pushrod is aligned with respect to the gasket by having a portion of an elongate shaft of the pushrod engaged with an alignment portion of each corresponding opening in the gasket at step 510. After all pushrods corresponding to a bank of cylinders of the engine have been mated and aligned, a cylinder head is positioned over the gasket, aligned with the crankcase, engaged with the pushrods, and fastened to the engine at step 512.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A gasket for use in an internal combustion engine between a crankcase and a cylinder head, the gasket comprising:
    a first plurality of cylinder openings arranged to correspond, one each, to a corresponding first plurality of cylinder bores formed in the crankcase;
    a second plurality of coolant openings and a third plurality of oil openings formed in a substrate sheet of material that makes up the gasket;
    a fourth plurality of pushrod openings formed in the substrate material of the gasket, wherein each of the fourth plurality of pushrod openings comprises a pass through portion having a semicircular shape with an internal diameter, D, and an alignment portion having a semicircular shape with an internal diameter, d;
wherein the diameter d is smaller than the diameter D, and wherein the pass-through portion is disposed adjacent to the alignment portion.

2. The gasket of claim 1, wherein the internal combustion engine is an engine having a plurality of cylinders arranged in a V-configuration, and wherein the fourth plurality of openings includes two openings that correspond to each of the plurality of cylinders.

3. The gasket of claim 1, wherein the gasket is arranged and constructed to be disposed between the crankcase and the cylinder head of the internal combustion engine.

* * * * *